United States Patent [19]

Brandner et al.

[11] Patent Number: 5,227,097
[45] Date of Patent: Jul. 13, 1993

[54] METHOD FOR MANUFACTURING A STIMULABLE LUMINESCENT STORAGE SCREEN

[75] Inventors: Gerhard Brandner, Zirndorf; Wolfgang Blum, Erlangen; Tanja Wegerer, Crailsheim, all of Fed. Rep. of Germany

[73] Assignee: Siemens Aktiengesellschaft, Munich, Fed. Rep. of Germany

[21] Appl. No.: 643,506

[22] Filed: Jan. 22, 1991

[30] Foreign Application Priority Data

Feb. 7, 1990 [EP] European Pat. Off. ........ 90102431.5

[51] Int. Cl.$^5$ ............................................. B29C 53/16
[52] U.S. Cl. ........................................ 264/21; 156/67; 313/469; 427/65
[58] Field of Search ........................... 264/21; 156/67; 313/478, 469, 474; 427/64, 65, 66

[56] References Cited

U.S. PATENT DOCUMENTS

| 3,825,436 | 7/1974 | Buchanan et al. | 264/21 |
| 3,859,527 | 1/1975 | Luckey | 250/327 |
| 4,362,946 | 12/1982 | Cusano et al. | 264/21 |
| 4,626,739 | 12/1986 | Shimulovich | 313/469 |
| 4,695,762 | 9/1987 | Berkstresser et al. | 313/474 |
| 4,835,437 | 5/1989 | Berkstresser et al. | 313/474 |

FOREIGN PATENT DOCUMENTS

| 0174875 | 3/1986 | European Pat. Off. . |
| 0350391 | 1/1990 | European Pat. Off. . |
| 0369049 | 5/1990 | European Pat. Off. . |
| 2521781 | 8/1983 | France . |
| 2024842 | 1/1980 | United Kingdom . |
| 2045795 | 11/1980 | United Kingdom . |

Primary Examiner—Jan H. Silbaugh
Assistant Examiner—Brian J. Eastley
Attorney, Agent, or Firm—Hill, Steadman & Simpson

[57] ABSTRACT

A method for manufacturing a stimulable luminescent storage screen, of the type used to store a latent x-ray image, with the image being read-out by excitation of the screen with radiation of a first wavelength, thereby causing the screen to emit radiation of a second wavelength, includes the step of using a transparent single crystal as the initial material for making the screen, and working the transparent single crystal to form the screen. Working of the transparent single crystal can be in the form of pressing the crystal, heating the crystal, or both.

9 Claims, No Drawings

METHOD FOR MANUFACTURING A STIMULABLE LUMINESCENT STORAGE SCREEN

BACKGROUND OF THE INVENTION

1. Field of the Invention

The present invention is directed to a luminescent storage screen having a stimulable phosphor for the latent storage of x-ray images.

2. Description of the Prior Art

Luminescent storage screens are known in the art wherein a latent x-ray image is stored using a stimulable phosphor, with read-out of the x-ray image being achieved by exciting the phosphor with radiation of a first wavelength (stimulating radiation), which causes the phosphor to emit radiation of a second wavelength, which is acquired by a detector. Such a luminescent storage screen is disclosed, for example, in European Application 0 174 875.

A luminescent storage screen of this type employed in an image pick-up device is described in U.S. Pat. No. 3,859,527. In such an x-ray diagnostics installation, a luminescent storage screen, consisting of a luminescing stimulable phosphor which is irradiated with x-rays, is used as a radiation-sensitive transducer. Electronic holes are generated in the stimulable phosphor by the incident radiant intensity, these holes being stored in traps having a higher energy level, so that the latent x-ray image is stored in the screen.

For read-out, the entire area or surface of this screen, used as a master, is caused to luminesce pixel-by-pixel by an additional radiation source, which may be a laser. Due to the stimulating radiation, the energy of the holes stored in the traps is boosted and they can fall back into lower energy levels, whereby the energy difference is radiated in the form of light quanta. The stimulable phosphor thereby emits light dependent on the energy stored in the phosphor. The light emitted as a result of this stimulation is detected and rendered visible, so that the x-ray image which was latently stored in the screen can be read out.

A problem in the read-out of such conventional screens is that the stimulable phosphor is not sufficiently transparent for the laser light. A minimum thickness of the stimulable phosphor is required to be able to achieve adequate x-ray quantum absorptions. In the case of a non-transparent, tightly compressed or sintered phosphor, the laser beam is so greatly attenuated by the phosphor that the penetration depth of the laser beam is too small. Because the energy is no longer adequate for boosting the holes to the energy level required for quantum emission, the information stored in the deeper levels cannot be read out.

The storage screen disclosed in the European Application 0 174 875 has phosphor grains which are applied on a substrate enveloped by a binder. The binder serves the purpose of fixing the phosphor grains. A light-transmissive carrier material is usually employed as the binder, which is transparent both for the exciting laser light and for the emitted luminescent light. A problem associated with screens of this type, however, is that the laser beam spreads increasingly with increasing penetration depth, due to scattering of the beam at the phosphor grains, so that the modulation transfer function of the overall system is degraded. A storage screen in binder technology also has poorer quantum x-ray quantum absorption, compared to a layer of comparable thickness of the stimulable phosphor.

It is preferable, however, to vapor-deposit the stimulable phosphor onto a carrier in a high vacuum, and to temper the phosphor in a protective gas atmosphere, or in the vacuum, or to compress the phosphor under vacuum and/or heating, as disclosed in European Application 0 369 049. It is also possible to reshape single crystals of stimulable phosphor to the large area required for medical diagnostics by compressing such crystals. The latter methods yield transparent stimulable phosphor panels. The advantage of the transparency is that the stimulating laser beam cannot be spread in the storage medium due to scattering at the grains of the material. Such spreading of the read-out beam, as noted above, considerably degrades the modulation transfer function of the overall system. Spreading of the laser beam upon transirradiation of the storage medium is greatly diminished by using a transparent stimulable phosphor manufactured, for example, by compressing the phosphor powder.

The powder pressing process, however, has three disadvantages.

First, particle boundaries between the powder particles can remain after pressing, these boundaries acting as scatter centers for the read-out radiation. The scattered read-out beam then also reads information from locations that are not correctly chronologically allocated to the read-out beam. The signal-to-noise ratio in the resultant image is thus degraded. The reason for the possible remainder of particle boundaries is that the powder particles can only be deformed by pressure when the pressure is coupled from one particle to the next, so that plastic deformation of the crystal occurs at that location. Because the particles touch at only a few points, it frequently occurs that a particle does not experience pressure from the suitable direction which would be required so that the plastic deformation is complete.

A second disadvantage is that many alkali halogenides experience a phase transition in the presence of high pressure. In the case of a RbBr stimulable phosphor doped with TlBr, this phase transition occurs at approximately 500 MPa. The RbBr stimulable phosphor at that point converts from a face-centered cubic structure (a NaCl-type structure) into a body-centered cubic structure (a CsCl-type structure). This transition takes place with a reduction in volume, and is reversible. When the pressure is removed after the pressing process, the crystal reverts into the NaCl-type structure. Because of the increase in volume associated with the re-conversion into the face-centered cubic structure, cracks and fissures may occur in the storage medium, which act as scatter centers for the read-out radiation.

A third disadvantage is that, due to the necessary coupling of the pressure from one powder particle to the next, the required pressure for making powders transparent by pressing is extremely high, greater than 500 MPa, and preferably 1000 MPa in the case RbBr, so that the manufacture of a large-area storage medium is extremely difficult.

SUMMARY OF THE INVENTION

It is an object of the present invention to provide a method for manufacturing a luminescent storage screen of the type described above which produces a storage screen having a high x-ray quantum absorption with high imaging sharpness, a good modulation transfer function, and which is easy to manufacture.

The above object is achieved in accordance with the principles of the present invention in a method for manufacturing a luminescent storage screen wherein a transparent single crystal is employed as the initial material. Particle boundaries cannot be present in such a single crystal, since there is only one body instead of a plurality of bodies, with no internal boundaries or cavities. As a result, no scatter centers arise, so that a high imaging sharpness is achieved.

DESCRIPTION OF THE PREFERRED EMBODIMENTS

In accordance with the principles of the present invention, a luminescent storage screen is formed by using a transparent single crystal as the initial material, and working the single crystal to produce the storage screen. Working of the crystal preferably is in the form of applying pressure to the single crystal. Smaller single crystals can by this technique be worked to the large area required for x-ray diagnostics. The pressing process does not create stresses when the single crystal is tempered. It is preferable that the single crystal be pressed in a vacuum, or in a protective gas atmosphere. It is also preferable that the single crystal be heated to a temperature of 100° C. through 400° C., and is pressed with a pressure from 1 through 50 MPa. The build-up of high stresses in the single crystal can be avoided if it is first pressed with a low pressure, which is slowly increased to a maximum pressure.

As a result of using a single crystal having no particle boundaries, inner boundaries or cavities, a storage screen which is free of beam scattering centers is obtained. The required pressing force can be maintained significantly lower than in the manufacture of luminescent storage screens using the known powder technique, so that the pressing forces for manufacturing large area screens no longer represent technological difficulties. The required pressure lies significantly below 500 MPa, which is the minimum which would be required for creating such a screen from a powdered phosphor. Since it is not necessary to exceed 500 MPa, the unwanted, reversible phase transition in the case of RbBr phosphor is not induced.

Reshaping of the single crystal by pressing is preferably implemented while heating the crystal. This results in the dynamic recrystallization being excited to an increasing degree with increasing temperature. The recrystallization is a softening process of the material, which prevents the creation of high stresses during the reshaping. Breakage of the material is thereby avoided. Crack-free deformability increases with increasing temperature for this reason.

A luminescent storage screen without scatter centers can be manufactured, for example, using RbBr doped with TlBr, or RbI doped TlI, or some other suitable stimulable phosphors, in single-crystal form, and heating the single-crystal phosphor to a temperature from 100° C. through 400° C., preferably 300° C. The heating may take place in a vacuum. Working of the single crystal may also ensue under a protective gas atmosphere. Subsequently, pressure from, for example, 1 through 50 MPa is applied to the crystal for a few minutes through a few hours. Care must be exercised to achieve a slow increase in the pressure, so that the single crystal does not break. Thus, for example, a cuboid single crystal having an edge length of 15 cm can be reshaped in an approximately round plate having a diameter of approximately 40 cm, at a height of approximately 2 cm. This plate has no internal scatter centers.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for manufacturing a stimulable phosphor luminescent storage screen for the latent storage of x-ray images, said screen being subjected, for read-out of the stored x-ray image, to excitation by radiation having a first wavelength which causes radiation having a second wavelength to be emitted, said method comprising the steps of:

providing a transparent single-crystal phosphor as initial material; and pressing said single-crystal phosphor into a storage screen.

2. A method as claimed in claim 1 wherein the step of pressing said single-crystal phosphor is further defined by tempering said single-crystal phosphor.

3. A method as claimed in claim 1 wherein the step of pressing said single-crystal phosphor is further defined by pressing said single-crystal phosphor while heating said single-crystal phosphor.

4. A method as claimed in claim 1 wherein the step of pressing said single-crystal phosphor is further defined by pressing said single-crystal phosphor in a vacuum.

5. A method as claimed in claim 1 wherein the step of pressing said single-crystal phosphor is further defined by pressing said single-crystal phosphor in a protective gas atmosphere.

6. A method as claimed in claim 1 comprising the additional step of heating said single-crystal phosphor to a temperature in the range of from 100° C. through 400° C.

7. A method as claimed in claim 1 wherein the step of pressing said single-crystal phosphor is further defined by pressing said single-crystal phosphor with a pressure in the range of from 1 through 50 MPa.

8. A method as claimed in claim 1 wherein the step of pressing said single-crystal phosphor is further defined by the steps of:

pressing said single-crystal phosphor with a low pressure; and slowly increasing said pressure to a maximum pressure.

9. A method for manufacturing a stimulable phosphor luminescent storage screen for the latent storage of x-ray images, said screen being subjected, for read-out of the stored x-ray image, to excitation by radiation having a first wavelength which causes radiation having a second wavelength to be emitted, said method comprising the steps of:

providing a transparent single-crystal phosphor as initial material; and pressing said single-crystal phosphor with a pressure in the range of from 1 through 50 MPa and heating said single-crystal phosphor to a temperature in the range of from 100° C. through 400° C. to form said single-crystal phosphor into a storage screen.

* * * * *